Aug. 25, 1964  W. M. DUNN  3,146,039
BALL BEARING
Filed July 31, 1961

INVENTOR.
WILLIAM. M. DUNN
BY Fulwider Mattingly & Huntley
ATTORNEYS

United States Patent Office 3,146,039
Patented Aug. 25, 1964

3,146,039
BALL BEARING
William M. Dunn, West Covina, Calif., assignor to Federal-Mogul-Bower Bearings, Inc., Detroit, Mich., a corporation of Michigan
Filed July 31, 1961, Ser. No. 128,019
5 Claims. (Cl. 308—201)

This invention relates to bearings for rotatable machine elements, and more particularly relates to miniature precision type ball bearings for low load, low friction, and extremely high speed applications.

Heretofore, ball bearings used under low load and very high speed conditions and where low torque, low vibrational levels, and long bearing life are required, such as in connection with certain kinds of precision mechanisms and instruments, gyroscopes, small high speed motors, moving components of certain electronic apparatus, and the like sensitive devices, have more or less followed the conventional construction of employing a complement of a relatively large number of small bearing balls contained between the raceways of suitable inner and outer bearing rings. Such ball bearings have also heretofore usually employed conventional snap type ball retainers for circumferential spacing apart of the balls around the raceways between the inner and outer bearing rings. These retainers have been made in various forms and of various materials, all without knowledge and hence without regard to the critical effects which the materials, forms, and shapes of such retainers have on the performance characteristics of the bearings.

It has been found that conventional ball bearing constructions, particularly in the sizes categorized as "miniature," have a number of disadvantages and defects when employed in the before mentioned kinds of services and mechanisms, first among them being a substantially higher than desirable frictional torque both in starting and running conditions, apparently due, to some extent, to the interaction and redundancy of support and centering of the bearing rings resulting from the action of the usual relatively large number of balls used. Also such ball bearings have been unnecessarily complicated and difficult to assemble, particularly in the miniature sizes.

It has also been found that different configurations of the snap type retainer rings for the bearing balls and the resultant dynamic characteristics thereof result in differences in frictional torque and in markedly different wear lives of the ball bearings with which they are used.

It is, therefore, a primary object of this invention to provide a ball bearing construction having reduced friction.

It is a further object of this invention to provide a ball bearing construction having improved smoothness of running operation.

It is a still further object of this invention to furnish a ball retainer construction for use in ball bearings which results in improved wear life of the bearing.

It is a still further object of this invention to contribute a ball retainer construction which results in reduced frictional torque of the ball bearings in which it is incorporated.

The objects of this invention are in part accomplished as a result of the discovery that, for reasons not yet fully determined, the frictional torque of ball bearings of the kind and particularly in the miniature sizes with which this invention is primarily concerned, is critically affected by the number of bearing balls employed and that the friction torque undergoes an abrupt reduction to unexpectedly low values when the complement of bearing balls is reduced from any larger number to three in number. This reduction in frictional torque is particularly evident when the three bearing balls are relatively widely separated or spaced apart circumferentially about the raceways of the bearings.

The objects of this invention are also in part accomplished as a result of the discovery that, for reasons not yet entirely understood, ball bearings employing snap type ball retainers, particularly retainers which are made of plastics or the like materials, have their wear lives greatly increased and to some extent their frictional torque decreased by so proportioning or shaping the retainer in each bearing that its distribution of mass is such that the center of mass of the retainer ring section as a whole lies both on the longitudinal axis of the bearing and in a normal or radially extending plane intersecting the centers of the bearing balls. Furthermore, preferably, although not necessarily, the form of the ring should also be such that, under high speed rotation, it is in dynamic balance with respect to both its longitudinal axis and with respect to centrifugal forces tending to torsionally distort the retainer ring about an annular axis of the ring section lying in a radially extending plane midway between the opposite ends thereof. This latter effect is accomplished by locating the before mentioned normal or radially extending plane midway between the opposite ends of the retainer ring.

Other objects, advantages, and features of novelty of the invention will be evident hereinafter.

In the accompanying drawings wherein, in connection with the following specification, the presently preferred embodiments of the invention are illustrated and wherein in like reference characters refer to the same or similar parts throughout the several views.

Figure 1:
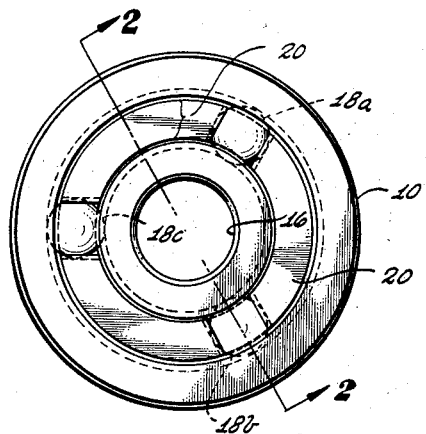
FIGURE 1 is an enlarged end elevational view of a bearing assembly embodying the present invention.
Figure 2:
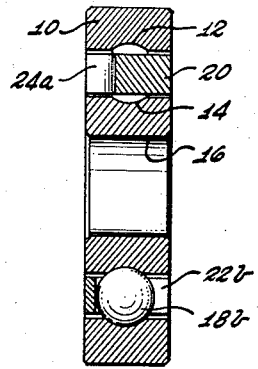
FIGURE 2 is a longitudinal sectional view of the bearing assembly taken as indicated on line 2—2 of FIGURE 1.

Referring first primarily to FIGURES 1 and 2, the elements designated by reference numerals 10 and 11 are concentric, outer and inner bearing rings, respectively. These bearing rings may be composed of various metals, but stainless steel has been found advantageous in many applications. The outer bearing ring 10 has formed on the inner cylindrical surface thereof an outer bearing ball raceway groove 12, and the inner bearing ring 11 has formed on the outer cylindrical surface thereof an opposite, inner bearing ball raceway groove 14, and the inner bearing ring 11 is also provided with a concentric bore 16 adapted to receive a shaft to be rotatably supported by the bearing.

Equally, peripherally spaced apart in the bearing assembly and retained between the inner and outer bearing ball raceway grooves 12 and 14 of the bearing rings 10 and 11, respectively, are three bearings balls 18a, 18b, and 18c of equal diameter. These three bearing balls, which may be made of the same material as the bearing rings, are maintained equally circumferentially spaced apart by means of an intermediate, generally annular snap retainer ring body 20, the exact form and construction of which includes an important feature of this invention as hereinafter more fully explained.

The snap retainer ring body 20 may be composed principally of a porous, normally resilient material such as, for example, a suitable thermosetting phenolic plastic. Preferably, the retainer body is made by impregnating plies of a bore material, such as paper, fabric, asbestos, glass, or synthetic fibres with a synthetic resin, such as the before mentioned phenolic plastic, and bonding such material together under applied heat and pressure, and preferably under such condition as to result in slight porosity of the finished body, enabling it to absorb a liquid lubricant and exude such lubricant onto the bearing balls retained thereby.

The retainer ring body is formed with three equally, circumferentially spaced apart, radially directed, semicylindrically shaped ball retainer pockets 22a, 22b, and 22c, each communicating with one end of the retainer ring through a longitudinal, generally rectangular shaped access slot, as shown at 24a, 24b, and 24c. The access slots 24a, 24b, and 24c are slightly narrower with reference to the circumference of the ring body than the outside diameters of the balls to be retained, and narrower than the inside diameters of the ball retaining pockets, such as to permit the balls to be forced, with slight interference, through the access slots and therefrom snapped into the ball retaining pockets wherein they are retained in a relatively loose, freely rotatable fit. Formed in the annular end surface of the retainer ring body 20, opposite the end into which the longitudinal access slots extend, are three equally, circumferentially spaced apart, semicylindrical, balancing cavities or recesses 26a, 26b, and 26c, of equal size and shape, and staggered annularly about the longitudinal axis of the ring with respect to the before mentioned access slots.

Dimensionally, the sizes, shapes, and locations of the balancing cavities or recesses 26a, 26b, and 26c with respect to the sizes, shapes, and locations of the access slots 24a, 24b, and 24c, and the ball retaining pockets 22a, 22b, and 22c may be varied considerably from those shown, but are made such that, considering the average effective radial section through the retainer body, its center of mass lies both on the longitudinal axis and in a plane which is normal to the longitudinal axis thereof and in which plane the radially extending axes of the ball retaining pockets lie. Additionally, preferably, although not necessarily, the ball retaining pockets are located as here shown, such that the aforesaid normal plane is midway between opposite ends of the ball retainer ring.

As hereinbefore mentioned, it has been discovered that in miniature sized ball bearings for low load, and particularly for combined low load and high speed applications, the limiting of the number of the bearing balls employed in such bearing to three, results in an unexpectedly large reduction of the torsional friction thereof as compared with such ball bearings employing any greater number of bearing balls. Furthermore, when such three bearing ball construction is combined with the features of the balanced type of bearing ball retainer ring body hereinbefore described, greater bearing life in addition to further reduced torsional friction results. Although, as before stated, the reasons for these improved characterists of the bearing are not entirely understood it is believed possibly due to the elimination of redundant interaction between the bearing balls and the bearing raceways which appear to result when the usual relatively large number of bearing balls are used. Furthermore, in operation, it appears quite conclusive that by constructing the bearing ball retainer ring body in the manner herein described, the effect is such that the points of contact between the walls of the retaining pockets of the ball retainer ring body and the several balls therein remain centered with respect to the bearing balls, thereby maintaining the application of the lubricant material carried by the retainer ring to the portion of the surfaces of the bearing balls which make rolling contact with the raceway grooves. In the absence of maintaining the ball retainer ring in the herein before described balanced condition, it has been found that the point or areas of contact between the retainer ring body and the balls occur at longitudinally offset locations with respect to each bearing ball, apparently resulting in the application of the lubricant from the retainer ring to the side portions of each of the bearing balls which only infrequently come into bearing contact with the surfaces of the inner and outer raceway grooves.

Figure 6:
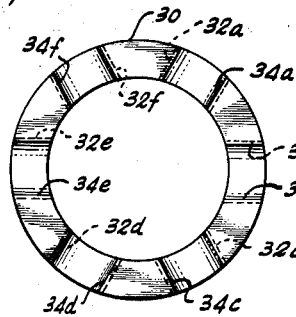
FIGURE 6 is an end elevational view of the ball retainer of FIGURE 5 as viewed from line 6—6.
Figure 7:
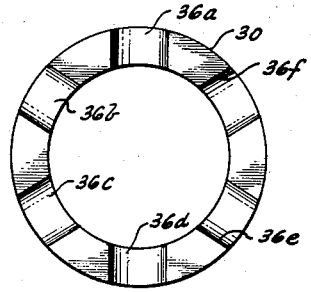
FIGURE 7 is an end elevational view of the ball retainer of FIGURE 5 as viewed from line 7—7.

The forming and balancing of the ball retainer ring, as hereinbefore described, while particularly advantageous, as hereinbefore described in connection with the three bearing ball assembly, is similarly advantageous in itself in connection with ball bearing assemblies employing various greater numbers of bearing balls. In regard to the latter feature, reference is now made particularly to FIGURES 5, 6, and 7 of the drawings, in which, by way of example, a modified form of bearing ball retainer ring is shown for use in connection with a ball bearing assembly having a complement of six bearing balls. The retainer ring body 30 which, as in the case of retainer ring body 20, may be composed mainly of a porous, normally resilient plastic material, is formed with six equally circumferentially spaced apart, radial, semicylindrically shaped ball retaining pockets 32a, 32b, 32c, 32d, 32e, and 32f, each communicating with one and the same annular end surface of the retainer ring through a longitudinally, generally rectangular shaped access slot, as shown at 34a, 34b, 34c, 34d, 34e, and 34f. As described in connection with FIGURES 3 and 4, the circumferential width of each of the access slots is slightly narrower than the outside diameters of the bearing balls to be retained, and narrower than the inside diameters of the ball retaining pockets, thereby permitting the balls to be forced with slight interference through the access slots and snapped therefrom into the ball retaining pockets wherein they are freely rotatably retained. Formed in the annular end surface of the retainer ring body 20 opposite the end into which the before mentioned longitudinal access slots all extend, are six equally, circumferentially spaced apart, semicylindrical balancing cavities 36a, 36b, 36c, 36d, 36e, and 36f of equal size and shape and staggered annularly about the longitudinal axis of the ring with respect to the before described access slots and ball retaining pockets.

Figure 3:
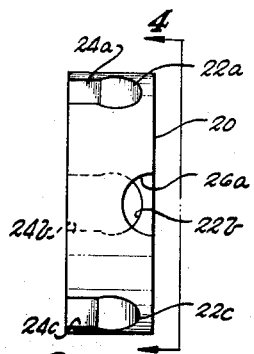
FIGURE 3 is a separate, detailed side elevational view of the bearing ball retainer body employed in the apparatus of FIGURES 1 and 2.
Figure 4:
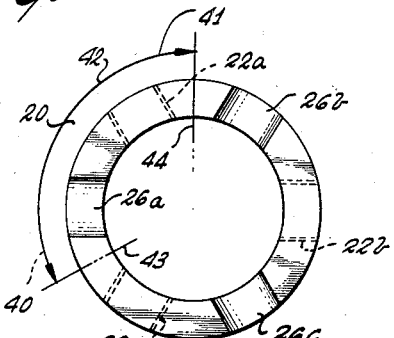
FIGURE 4 is a separate, detailed end elevational view of the bearing ball retainer employed in the apparatus of FIGURES 1, 2, and 3, taken as indicated from line 4—4 at the end thereof opposite to that shown in FIGURE 1.
Figure 5:
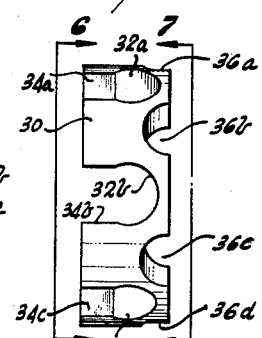
FIGURE 5 is a separate, enlarged, detailed side elevational view of a modified form of bearing ball retainer.

The sizes, shapes, and locations of the balancing cavities 36a to 36f, inclusive, with respect to the sizes, shapes, and locations of the access slots 34a to 34f, inclusive, and the ball retaining pockets 32a to 32f, inclusive, are made such as to maintain the mass distribution the same as that hereinbefore mentioned in connection with the ball retainer ring body 20 of FIGURES 3 and 4.

While, for convenience of manufacture, the particular shapes and locations of the ball retaining pockets, access slots, and balancing cavities hereinbefore described and illustrated in the drawings, is advantageous, such shapes and locations can be varied to some degree so long as the before mentioned relationships and conditions of balance are maintained. For example, the ball retaining pockets, instead of being semicylindrical in form as herein illustrated may, if desired, be semispherical or other suitable form. Similarly, the balancing cavities may depart from the semicylindrical forms herein illustrated and any other means of removing material from the closed face of the retainer may be employed, so long as the required overall distribution of mass of the material removed thereby with respect to the before mentioned radial reference plane remains unchanged or otherwise meets the requirements for maintaining the required balance.

Figure 8:
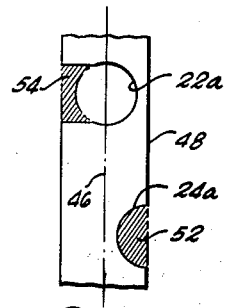
FIGURE 8 is a fragmentary, developed portion of the bearing ball retainer body of FIGURES 1 to 4, inclusive.

In designing the retainer ring to fulfill the balance and center of mass or moment of inertia conditions hereinbefore specified, a number of different methods obviously may be employed, including mathematical computations and graphical determinations. For example, if simple, regular forms are employed for the ball retaining pockets, the access slots and the balancing cavities, the required design conditions can be arrived at in general by graphical methods such as the one illustrated in FIGURE 8. In this figure, a typical developed portion of the outer cylindrical surface of the retaining ring is illustrated, which extends repetitively around the periphery of the retaining ring, as indicated in FIGURE 4 by the arc 42, terminated by arrows 40 and 41 between the radial lines 43 and 44. Assuming that the bearing retaining pocket as shown at 24a is cylindrical, with its axis radially directed and lying in a normal plane indicated by the dotted line 46 midway between the opposite ends 48 and 50 of the retainer ring, then the balancing cavity 24a should be of such area, shape, and position that the product of its area, indicated by the dotted cross-hatched portion 52, and the distance of its center of area from the center line 46 is equal to the product of the area of the dotted, cross-hatched portion of the access slot, as shown at 54, and the distance of its center of area from the center line 46.

As hereinbefore mentioned, this invention is particularly operable with ball bearings of the size generally termed "miniature" which in the art is generally considered to include ball bearings the outer bearing rings of which have outside diameters less than approximately 0.75 inch. The present invention has significant importance in connection with miniature sized bearings especially the high precision, miniature types presently employed largely in instrumentation where frictional torque values and other characteristics of the bearings produce effects which assume importances of a higher than ordinary order.

The foregoing is illustrative of preferred embodiments of the invention and is not to be considered as limiting. Variations therein may be made by those skilled in the art, and the invention is to include any such variations and any apparatus which accomplishes the objects of this invention within the scope of the appended claims.

What is claimed is:

1. A bearing ball retainer ring for a radial ball bearing comprising: a generally annular body having a plurality of circumferentially, equally spaced apart bearing ball retainer pocekts extending laterally therethrough and an opening extending longitudinally between each of said retainer pockets and one end edge of said body for insertion of bearing balls therethrough into each of said pockets; a plurality of indentations formed in the end edge of said body opposite the first mentioned end edge, said indentations being of such size, shape, and position as to locate the center of mass of said body in a plane which is normal to the longitudinal axis of said body and intersecting the centers of said retainer pockets.

2. In a radial ball bearing assembly having an outer bearing member with a continuous circular raceway groove formed around its inner surface and a concentric inner bearing member with a continuous circular raceway groove formed around its outer surface, a bearing ball retainer comprising: a generally annular body positioned concentrically intermediate the said outer and inner bearing members and having a plurality of circumferentially, spaced apart bearing ball retainer pockets extending laterally therethrough, and an opening extending longitudinally between each of said retainer pockets and one end edge of said body, said retainer ring having its center of mass lying in a plane normal to its axis and intersecting the centers of said retainer pockets.

3. In a radial ball bearing assembly having an outer bearing ring with a continuous raceway groove formed around its inner cylindrical surface and a concentric inner bearing ring with a continuous raceway groove formed around its outer cylindrical surface, a bearing ball retainer comprising: a generally annular body positioned concentrically intermediate and rotatable relative to the said outer and inner bearing rings and having a plurality of circumferentially spaced apart bearing ball retainer pockets extending radially therethrough; and a passage extending from each of said retainer pockets to one end edge of said body; and a plurality of indentations formed in the end edge of said body opposite to the end edge to which said passages extend, said indentations being of such size, shape, and position as to locate the center of mass of said body in a plane normal to its longitudinal axis and intersecting the centers of said retainer pockets.

4. A ball bearing assembly comprising: an outer bearing member having a circular raceway groove around its inner surface; an inner bearing member having a circular raceway groove around its outer surface, said raceways being concentric; three equally, circumferentially spaced apart bearing balls rotatably positioned in said grooves between said outer and inner members, the said spacing apart of said bearing balls being greater than the diameter of said balls; and a generally annular bearing retainer body positioned concentrically intermediate the said outer and inner bearing members retaining said bearing balls in said equally, circumferentially spaced apart position during rotation of said outer and inner members relative to one another, said retainer body having therein a retaining pocket for each of said bearing balls and a passage extending to each of said pockets from an end edge of said body, and a plurality of indentations formed in the end edge of said body opposite to the aforesaid end edge, said indentations being of such size and location as to position the center of mass of said body in a plane normal to its logitudinal axis and intersecting the centers of said bearing balls.

5. A ball bearing assembly comprising: an outer bearing member having a circular raceway groove around its inner surface; an inner bearing member having a circular raceway groove around its outer surface, said raceways being concentric; three equally, circumferentially spaced apart bearing balls rotatably positioned in said grooves between said outer and inner members, the said spacing apart of said bearing balls being greater than the diameter of said balls; and a generally annular bearing retainer body positioned concentrically intermediate the said outer and inner bearing members retaining said bearing balls in said equally, circumferentially spaced apart position during rotation of said outer and inner member relative to one another, said retainer body having therein a retaining pocket for each of said bearing balls and a passage extending to each of said pockets from an end edge of said body, and a plurality of indentations formed in the end edge of said body opposite to the aforesaid end edge, said indentations being of such size and location as to position the center of mass of said body in a plane normal to its longitudinal axis, midway between the opposite ends thereof, and intersecting the centers of said bearing balls.

References Cited in the file of this patent

UNITED STATES PATENTS

| 1,366,312 | Danielsson | Jan. 18, 1921 |
| 2,035,417 | Allendorff | Mar. 24, 1936 |
| 2,062,807 | Cramer | Dec. 1, 1936 |
| 2,296,652 | Ray | Sept. 22, 1942 |
| 2,468,171 | Carlson | Apr. 26, 1949 |
| 2,558,737 | Darnell | July 3, 1951 |
| 2,665,958 | Waldherr | Jan. 12, 1954 |
| 2,819,129 | Slick | Jan. 7, 1958 |
| 2,911,268 | Staunt | Nov. 3, 1959 |
| 2,960,113 | Bradley | Nov. 15, 1960 |
| 3,123,413 | Heim | Mar. 3, 1964 |

FOREIGN PATENTS

| 494,084 | Great Britain | Oct. 19, 1938 |